United States Patent [19]
Kinto et al.

[11] Patent Number: 5,821,653
[45] Date of Patent: Oct. 13, 1998

[54] DRIVE APPARATUS FOR ELECTRIC VEHICLE

[75] Inventors: Yoshio Kinto, Okazaki; Masahiro Hasebe, Anjo; Yoshihiko Sasaki, Okazaki; Masayuki Takenaka, Nishio; Satoru Wakuta, Nagoya, all of Japan

[73] Assignee: Aisin AW Co., Ltd., Japan

[21] Appl. No.: 849,667

[22] PCT Filed: Dec. 24, 1996

[86] PCT No.: PCT/JP96/03752

§ 371 Date: Oct. 9, 1997

§ 102(e) Date: Oct. 9, 1997

[87] PCT Pub. No.: WO97/23362

PCT Pub. Date: Jul. 3, 1997

[30] Foreign Application Priority Data

Dec. 21, 1995 [JP] Japan .................... 7-349013

[51] Int. Cl.$^6$ .............. H02K 9/19; F16H 57/04
[52] U.S. Cl. ................. 310/89; 310/58; 310/83
[58] Field of Search .................. 310/58, 62, 63, 310/83, 89, 99, 112

[56] References Cited

FOREIGN PATENT DOCUMENTS 54-52265 4/1979 Japan .
3150050 6/1991 Japan .
6323404 11/1994 Japan .

*Primary Examiner*—Steven L. Stephan
*Assistant Examiner*—Judson H. Jones
*Attorney, Agent, or Firm*—Lorusso & Loud

[57] ABSTRACT

A drive apparatus for an electric vehicle comprises a motor (1), a gear section (9) for transmitting rotation of a rotor shaft (2) of the motor to a wheel, and a case (10, 90) for accommodating the motor and the gear section. The case has a partition (12) that separates a motor chamber (m) for accommodating the motor and a gear chamber (g) for accommodating the gear section, and the partition has an orifice (53) that connects a lower portion of the motor chamber and the gear chamber. Supplying means (5) is provided for supplying oil from the gear chamber into the motor chamber in accordance with rotation of the gear section. Through the operation of the orifice, oil gathers in a lower portion of the motor chamber and, thus, the motor chamber serves as a reservoir. Thus, while employing a light-weight and compact-size construction that does not comprise an oil reservoir, the drive apparatus secures a sufficient amount of lubricating oil during stop of the vehicle, and reduces the stirring loss of the gear section and cools the motor with oil during the running of the vehicle.

4 Claims, 10 Drawing Sheets

DRIVE APPARATUS FOR ELECTRIC VEHICLE

TECHNICAL FIELD

The present invention relates to a drive apparatus for an electric vehicle and, more particularly, to lubricating means of a drive apparatus for an electric vehicle combining a motor and a gear section for transmitting the drive force of the motor to wheels.

BACKGROUND ART

As one form of drive apparatuses for electric vehicles, there is a type of apparatus that combines a motor and a gear section for transmitting the drive force of the motor to wheels. In this type of drive apparatus, the gear section must be lubricated whether the motor is cooled by air or cooled by oil. Normally, since the gear section of the drive apparatus including a differential gear must be provided with a sufficient amount of lubricating oil for the next start during stoppage of the vehicle, it is necessary that the oil level in the gear case be high so that the entire differential gear case is immersed in the oil. In contrast, during the running of the vehicle, since the lubricating oil is sufficiently distributed to each part of the gear section, there is no need to keep the oil level high in the gear case as mentioned above. On the contrary, the oil level needs to be reduced to a minimum required level, in order to reduce the stirring loss of the gear section. In view of such circumstances, the specification of U.S. Pat. No. 5,295,413 discloses a technology that adjusts the oil level in the gear case as discussed above, by supplying oil to and discharging oil from an oil reservoir disposed in an upper portion of the gear case.

For drive apparatuses for electric vehicles, there is a strong demand for weight reduction and size reduction, considering electric power consumption reduction for a travel distance increase and the problem of installation of the apparatus in a vehicle. Viewing the aforementioned technology from this standpoint, the technology has problems of an weight increase of the drive apparatus caused by an increased size of the gear case since the oil reservoir is disposed in the gear case requiring an oil reservoir space in addition to the space needed to accommodate the gear section.

Accordingly, it is a first object of the present invention to provide a drive apparatus for an electric vehicle that has a light-weight and compact-size construction and enables reduction of the stirring loss of the gear section during the running of the vehicle while securing a sufficient amount of lubricating oil during stoppage of the vehicle without requiring an additional oil reservoir.

In addition, it is a second object of the present invention to enable the circulation of lubricating oil for achieving the above object without allowing the circulation to cause a drive loss.

Furthermore, it is a third object of the present invention to cool a motor while maintaining an appropriate oil level in the motor chamber during the running of the vehicle and preventing a stirring loss due to the rotation of the rotor.

DISCLOSURE OF THE INVENTION

To achieve the aforementioned first object, the present invention is characterized by comprising a motor including a stator and a rotor having a rotor shaft that is rotatable inside the stator, a gear section for transmitting the rotation of the rotor shaft to a wheel, and a case for accommodating said motor and the gear section, wherein the case has a partition that separates a motor chamber for accommodating said motor and a gear chamber for accommodating said gear section, and the partition has an orifice that connects a lower portion of said motor chamber and said gear chamber, and supplying means is provided for supplying oil from said gear chamber into said motor chamber in accordance with rotation of said gear section.

In the above-described construction, oil is supplied from the gear chamber into the motor chamber by the supplying means in accordance with the rotation or revolution of the gear section or the motor during the running of the vehicle. The oil supplied to the motor chamber is then returned to the gear chamber through the orifice of the partition. In this operation the oil level in the gear chamber decreases because the amount of oil supplied into the motor chamber by the supplying means is greater than the amount of oil returned to the gear chamber through the orifice so that oil accumulates in the motor chamber In contrast, during stoppage of the vehicle, the supplying means stops supplying oil from the gear chamber into the motor chamber since the motor and the gear section stops revolving, whereas oil continues returning from the motor chamber to the gear chamber through the orifice of the partition. Thus the amount of oil in the motor chamber decreases, and the oil level in the gear chamber rises. Thereby, the apparatus reduces the stirring loss of the gear section during the running of the vehicle by lowering the oil level in the gear chamber, and provides a sufficient amount of lubricating oil for the gear section for a start by raising the oil level in the gear chamber during stoppage of the vehicle. Thus, the apparatus utilizing the motor chamber as an oil reservoir, eliminating the need to provide an oil reservoir in the gear chamber and allowing a compact design of the gear case. In addition, since the oil can be held in the motor chamber during the running of the vehicle, the stator can be oil-cooled in a dipped state, thus enhancing the motor cooling effect.

In addition, to achieve the aforementioned second object, the supplying means comprises an oil receiver for gathering oil in the gear chamber dragged up by rotation of the gear section and leading it to the motor chamber.

Since this construction gathers an amount of oil in the gear chamber dragged up by rotation of the gear section, into the oil receiver, and supplies it into the motor chamber, the drive apparatus for an electric vehicle can be reduced in size by simplifying the construction of the supplying means.

Furthermore, to achieve the aforementioned third object, the apparatus has a construction where a window for communication between the motor chamber and the gear chamber is formed in a position that is above the orifice of the partition and at the same level as the lowermost position of the peripheral face of the rotor.

Since the window for communication between the motor chamber and the gear chamber is provided in a position that is above the orifice of the partition and at the same level as the lowermost position of the peripheral face of the rotor in this construction, the oil held in the motor chamber returns to the gear chamber through the window before oil reaches such a level that the rotor is dipped in oil. Thus, the provision of the window enables setting an oil level in the motor chamber such that the rotor is not dipped, thus making it possible to avoid a stirring loss of the rotor while cooling the motor.

BEST MODES FOR CARRYING OF THE INVENTION

Embodiments of the present invention will be described hereinafter with reference to the drawings. First, FIGS. 1–4 illustrates a first embodiment. The construction of this apparatus will first be roughly described. As shown in the axially developed sectional view of FIG. 1, the drive apparatus comprises a motor including a stator 4 and a rotor 3 having a rotor shaft 2 that rotates in the stator 4, a gear section 9 for transmitting rotation of the rotor shaft 2 to wheels (not shown), and a case that accommodates the motor 1 and the gear section 9 (formed by combining a motor case 10 and a gear case 90 as described below according to this embodiment). The case has a partition 12 that separates a motor chamber m accommodating the motor 1 and a gear chamber g accommodating the gear section 9. The partition 12 has an orifice 53 that connects a lower portion of the motor chamber m and the gear chamber g in communication. The partition 12 is also provided with supplying means 5 for supplying oil from the gear chamber g into the motor chamber m in accordance with rotation of the gear section 9. The supplying means 5 has an oil receiver 51 for gathering oil in the gear chamber dragged up by rotation of the gear section 9 and guiding it to the motor chamber m. A window 52 for communication between the motor chamber m and the gear chamber g is formed in a position that is above the orifice 53 of the partition 12 and at the same level as a lowermost position of the peripheral face of the rotor 3 of the motor 1.

Figure 1:
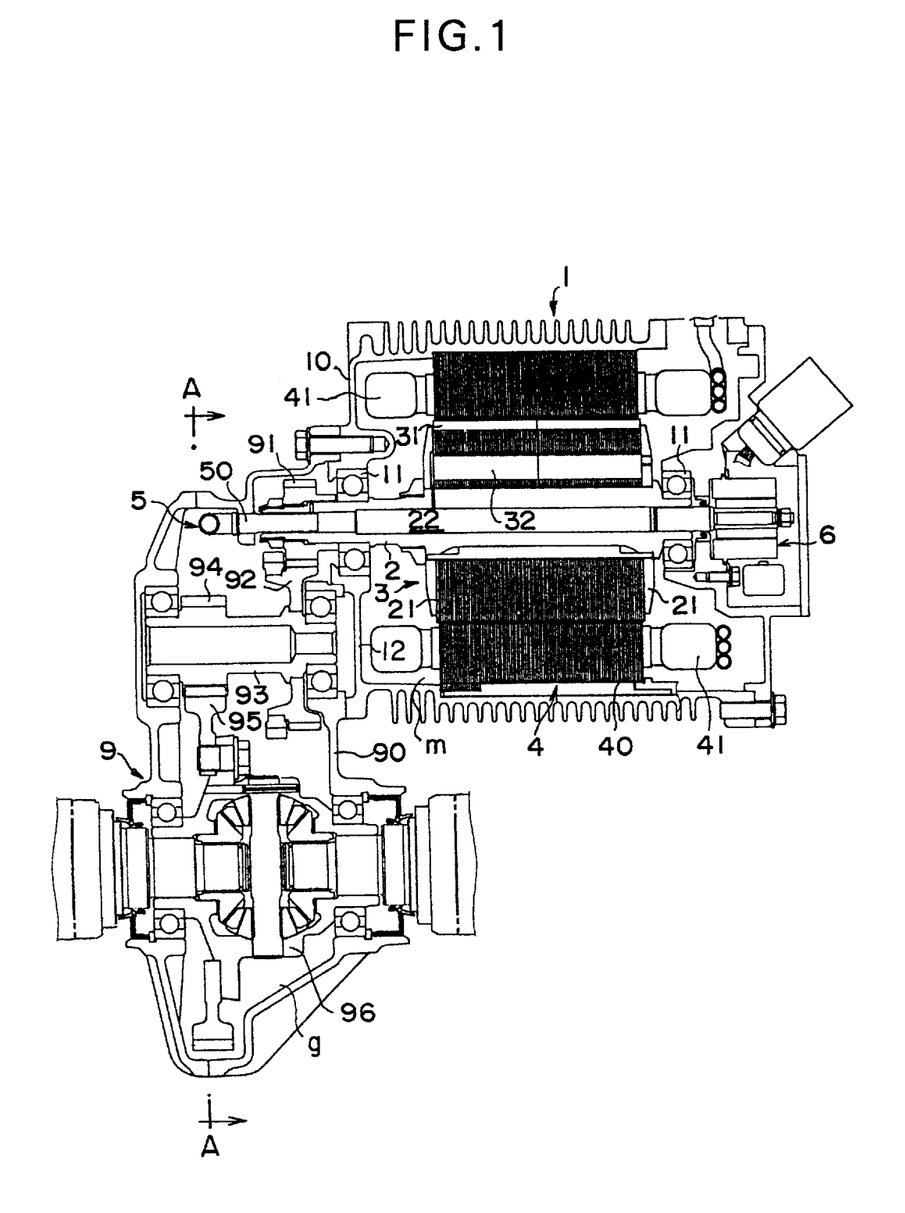
FIG. 1 is a sectional view of a drive apparatus for an electric vehicle according to a first embodiment of the present invention developed in the direction of axis.

The aforementioned portions will be sequentially described below. As shown in FIG. 1, the motor 1 comprises the motor shaft 2 supported freely rotatably at both ends on a motor case 10 by bearings 11, the rotor 3 fitted to the rotor shaft 2 in a rotation preventing manner and provided with a plurality of permanent magnets 31 corresponding in number to the magnetic poles, and the stator 4 having a core 40 that is fitted on its outer peripheral face to the motor case 10 in a rotation preventing manner by a key or the like and surrounds the outer peripheral face of the rotor 3, and coil ends 41 that protrude from the opposite axial ends of the core 40 where coil portions are inserted into slots of the core 40. In FIG. 1, reference character 6 denotes a resolver attached to one end of the rotor shaft 2 for detecting a magnetic pole position from rotation of the rotor shaft 2 for motor control using an inverter.

The gear section 9 comprises a counter gear mechanism and a differential mechanism so as to reduce the speed of rotation of the rotor shaft 2 of the motor 1 and increase the torque and transmit the rotation to the wheels as rotation in the same direction. The counter gear mechanism comprises a counter shaft 93 supported at both ends on the gear case 90 by bearings, a large-diameter gear 92 fixed to one end of the counter shaft 93 and meshed with an output gear 91 fixed to one of the rotor shaft 2, and a small-diameter gear 94 formed together with a second end portion of the counter shaft 93. The differential mechanism comprises differential gears formed of well-known bevel gears, a differential case 96 accommodating the differential gears, and a ring gear 95 fixed to the case 96 and meshed with the gear 94. Both ends of the differential case 96 are supported on the gear case 90 by bearings. The differential gears disposed in the differential case 96 are connected to the right and left-hand side wheels (not shown) by universal joints.

Figure 2:
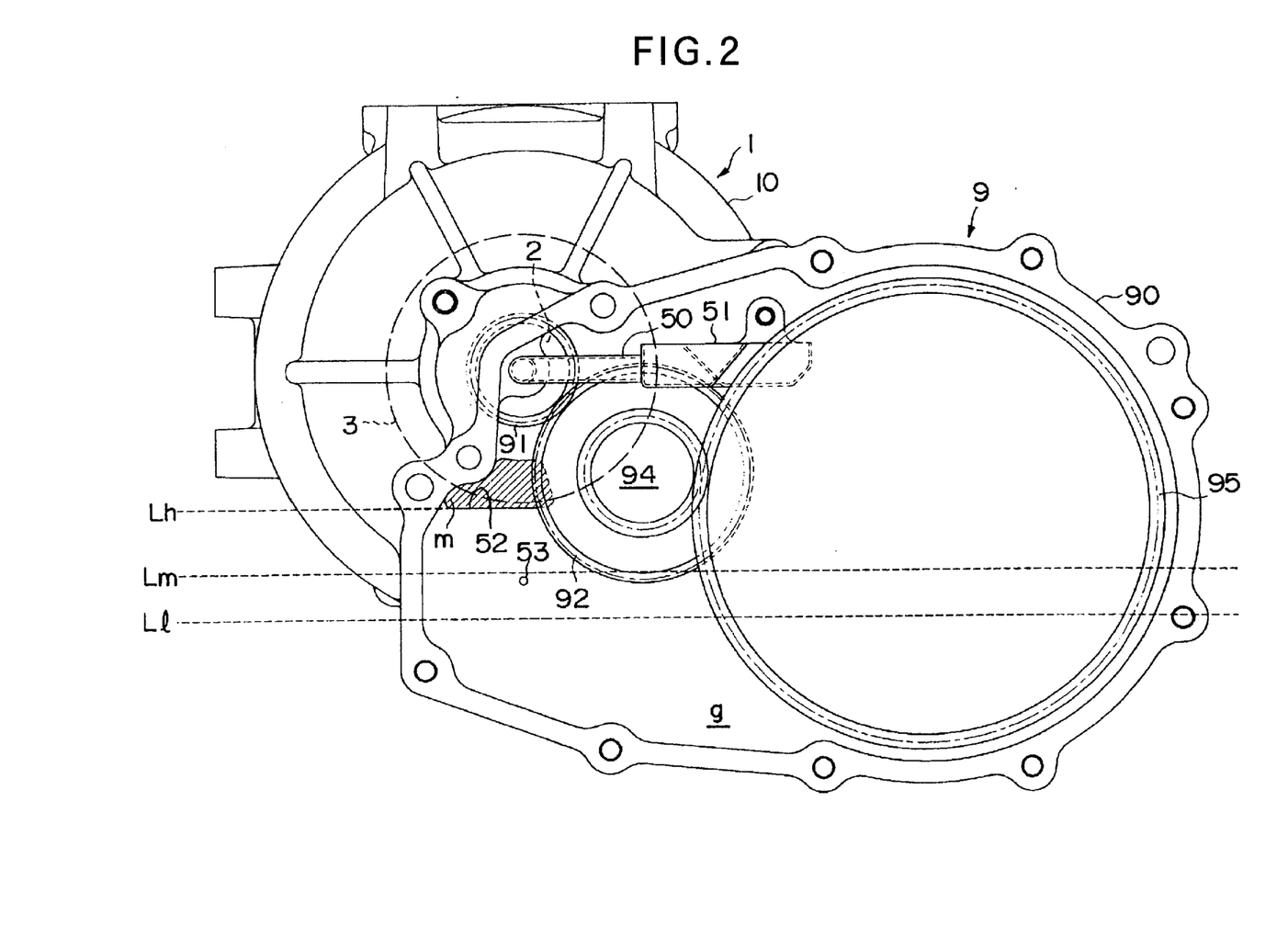
FIG. 2 is a view taken in A—A direction of FIG. 1.

The motor case 10 and the gear case 90 accommodating the motor 1 and the gear section 9 constructed as described above are connected to each other and integrated. The positional relationship between the motor 1 and the gears of the gear section 9 thus integrated is shown in FIG. 2, where the position of the motor case 10 is slightly shifted upward relative to the position of the gear case 90. In FIG. 2, the position of each gear is schematically indicated only by a border line that indicates the external shape of the gear.

As shown in FIG. 1 and FIG. 2, the supplying means 5 comprises an oil supply pipe 50 inserted into an end of an in-shaft oil passage 22 of the rotor shaft 2, from the side of the gear case 90 connected to the motor case 10, and the oil receiver 51 connected to the opposite end of the gear case 90, according to this embodiment. The oil supply pipe 50 is bent in the shape of a letter "L", and supported on the case at a portion near the bent. The opposite end of the oil supply pipe 50 is connected to and supported on the case 90 by the oil receiver 51.

Figure 3:
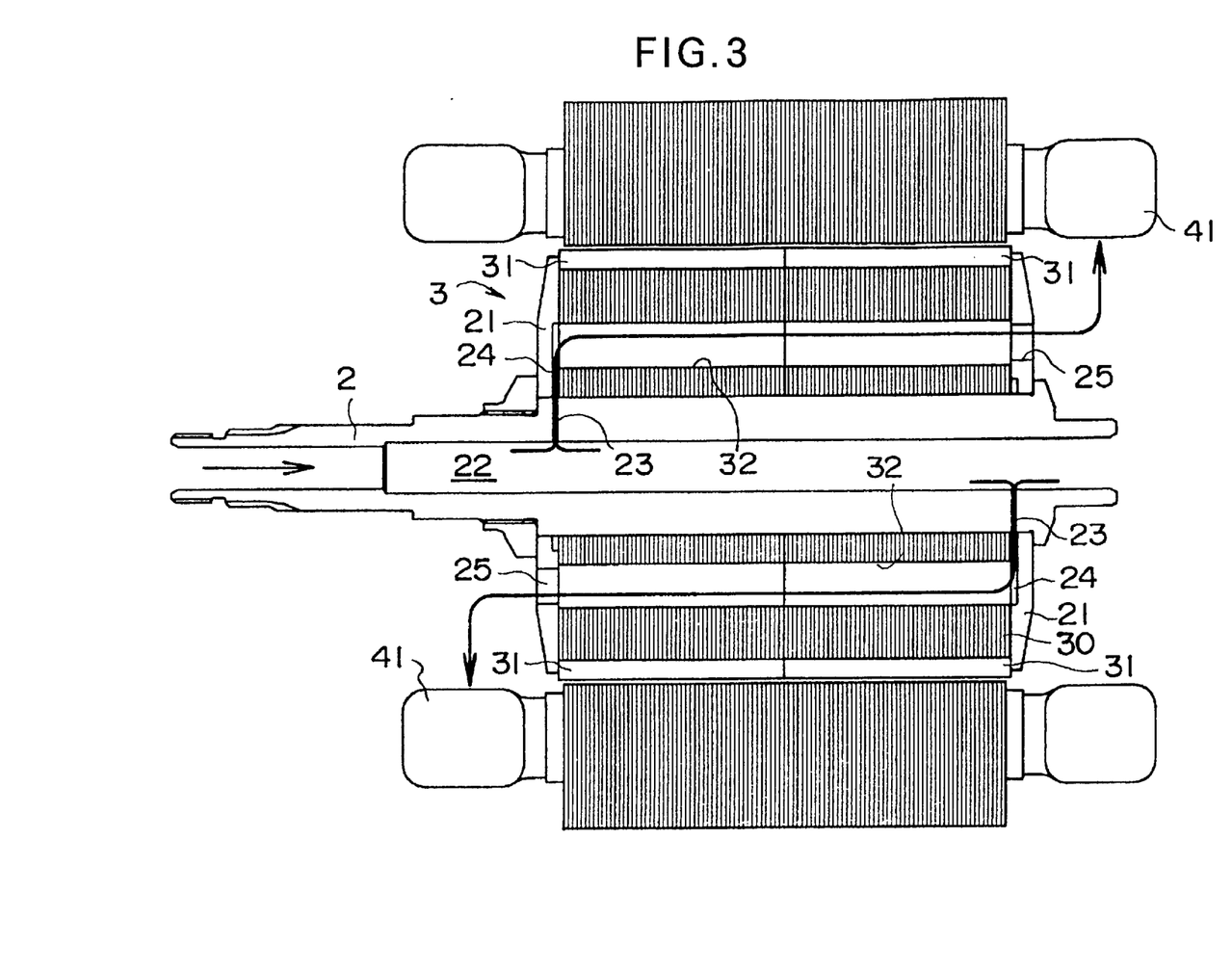
FIG. 3 is an axial sectional view of a rotor and a stator illustrating an arrangement of oil passages in the motor of this drive apparatus.

As illustrated in detail in FIG. 3, the oil passage inside the motor 1 includes the in-shaft oil passage 22 and radial oil passages 23 formed in the rotor shaft 2 and connected to the in-shaft oil passage 22, and axial oil passages 32 formed in the core 30 and extending therethrough in the direction of axis, and connection oil passages 24 formed in plate 21 that connect the radial oil passages 23 of the rotor shaft 2 and the axial oil passages 32 of the core 30, and oil holes 25 that are connected to the axial oil passages 32 of the core 30 and that open to portions of the core 30 located radially inward of the coil ends 41 of the stator 4, and the supplying means 5 for supplying oil into the in-shaft oil passage 22 of the rotor shaft 2 (see FIG. 1 and FIG. 2).

Figure 4:
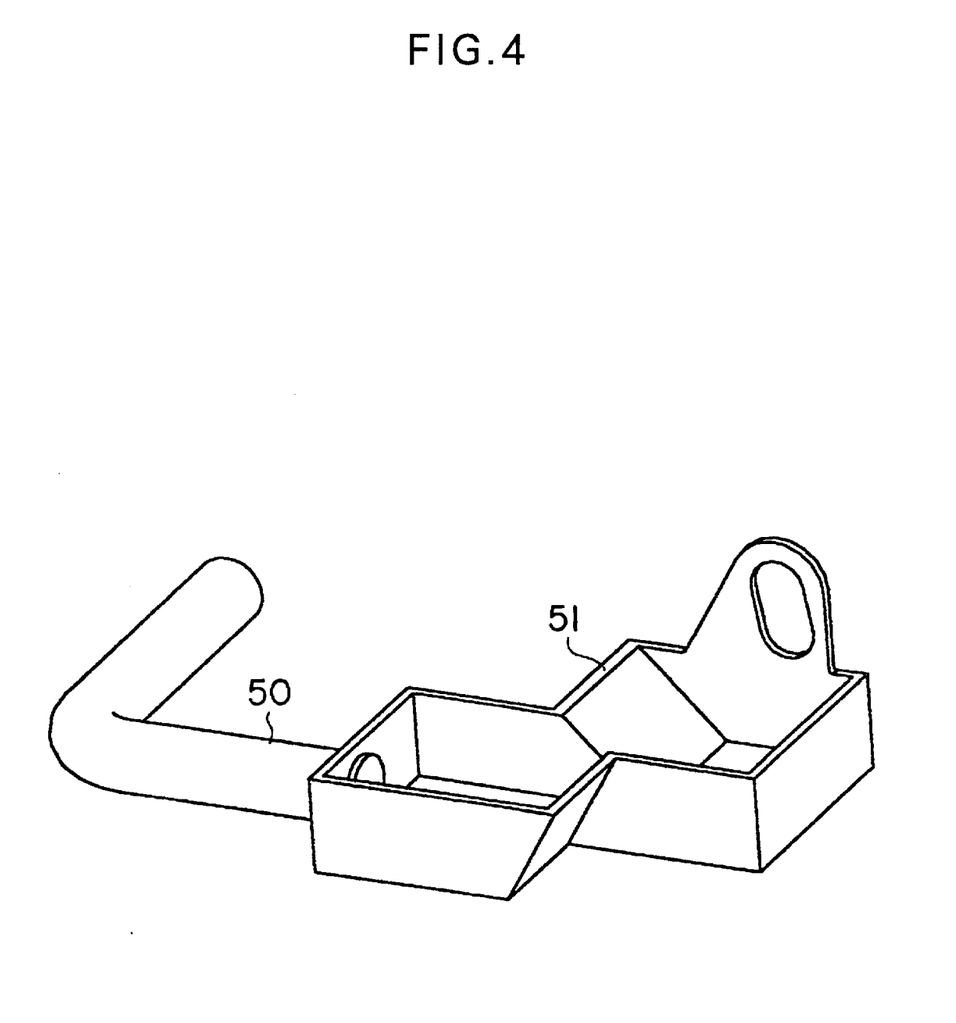
FIG. 4 is a detailed perspective view of an oil receiver of supplying means of the drive apparatus.

As illustrated in detail in FIG. 4, the oil receiver 51 has an upward opening box shape according to this embodiment, where diagonal corner portions are cut away so as to avoid interference with outer peripheral portions of the ring gear 95 and the large-diameter gear 92 of the counter gear and receive oil dragged up by rotation of the gears without a failure. The oil receiver 51 is positioned close to the outer peripheral portions of the ring gear 95 and the large-diameter gear 92 so as to face astride the outer peripheral portions of the gears 95, 92 in a stagger manner, and the oil receiver 51 is fixed to the case 20 at a predetermined height such that the oil receiver 51 is positioned at substantially the same level as the center axis of the in-shaft oil passage 22 of the rotor shaft 2 and can receive oil and guide it into the in-shaft oil passage 22 through the oil supply pipe 50 without using any special feeding means.

Referring back to FIG. 2, the motor case 10 and the gear case 90 are connected to each other by the window 52 formed in an end wall of the gear case 10. A lower edge portion of the window 52 functions as a dam to maintain the level of oil in the motor case 10, which is recovered in a lower portion of the motor case 10, to a level of a lowermost position of the outer peripheral face of the rotor 3 indicated by a broken line in FIG. 2. Thus the lower edge portion of the window 52 enables the lower portion of the motor case 10 to function as an oil reservoir. In addition, the two cases 10, 90 are also connected to each other by the small-diameter orifice 53 formed below the window 52. The orifice 53 gradually lets the recovered oil flow into the gear case 90 when the oil recovery to the lower portion of the motor case 10 is stopped, in order to balance the oil levels in the cases.

In the drive apparatus constructed as described above, the oil acting as a lubricant and a coolant is mainly held in the gear case 90 up to a level Lm indicated by an intermediate broken line in FIG. 2. In this state, a sufficient oil level is maintained for start operation for which the gear section 9 requires more lubricant than for normal traveling operation. When the motor 1 is started in this state, the ring gear 95 is driven by the motor 1 to rotate counterclockwise, and the large-diameter gear 92 of the counter shaft rotates clockwise. The oil dragged up by the rotation of the gears is collected into the oil reservoir 51. The collected oil is supplied from the gear case 90 into the in-shaft oil passage 22 of the rotor shaft 2 guided by the oil supply pipe 50.

In FIG. 3, flows of oil are indicated by arrows. Oil supplied into the in-shaft oil passage of the rotor shaft 2 as described above flows along the peripheral face of the in-shaft oil passage 22 by centrifugal force caused by rotation of the rotor shaft 2, enters the radial oil passages 23, and flows through the connection oil passages 24 of the plates 21 and the axial oil passages 32 of the core 30. The oil is sprayed from the holes 25 of the plates 21 to each coil end 41 by centrifugal force of the rotor 3. Thus, the oil reliably cools the core 30 while flowing one-way through the axial oil passages 32, and then reliably cools the coil ends 41 at the opposite ends of the stator 4 when discharged from the oil holes 25 and supplied to the coil ends 41.

After cooling the motor, oil flows down along the motor case 10 or drips from various portions to gather in a lower portion of the motor case 10. An amount of oil that exceeds the lower edge level of the window 52 returns to the gear case 90. Oil that gathers in a portion of the motor case 10 on a side of the core 40 remote from the gear case joint is guided to the side of the window 52 by some of key grooves formed on the motor case 10 for fixing the core 40 to the motor case 10 in a rotation preventative manner, that is, some key grooves that are not used for the fixing, according to this embodiment. During operation of the motor, the flowing of oil through the aforementioned oil passages and the like reduces the oil level in the gear case 90 to a level L1 indicated by the lowermost broken line in FIG. 2, and maintains the oil level in the motor case 10 at a level Lh indicated by the uppermost broken line, which enables the maximum cooling of the stator 4 without causing the stirring by rotation of the rotor 3. When the operation of the motor 1 is stopped, the flow of oil through the orifice 53 gradually balances the two oil levels, so that the oil levels will finally reach the level Lm indicated by the intermediate broken line in FIG. 2.

As described in detail above, the drive apparatus for an electric vehicle utilizes a lower portion of the motor case 10 as an oil reservoir during the running of the vehicle. Furthermore, the drive apparatus is provided with the orifice 53 formed in a lowermost portion of the motor case 10 for returning oil toward the gear section 9 during stoppage of the vehicle to prepare for a start of the vehicle. During the running of the vehicle, the apparatus lowers the oil level for the gear section 9 to reduce the gear stirring loss, and raises the oil level in the motor case 10 so that the stator 4 and the coil ends 41 can be dipped into the oil thus improving the cooling efficiency for the motor 1. During stoppage of the vehicle, the orifice 53 allows oil to move from the motor 1 toward the gear section 9 to raise the oil level for the gear section 9, thus ensuring lubrication for a start. In addition, this construction secures a sufficient amount of oil and increase the heat capacity without increasing the case capacity for installation of a reservoir.

Next, FIGS. 5–9 illustrate a second embodiment of the present invention. For a further size reduction of the apparatus from the first embodiment, the apparatus according to this embodiment has a construction where the distance between the rotor shaft 2 and the differential gears is made as short as possible. For this construction design, this embodiment employs a consolidated unit of the motor case and the gear case, which are separate units according to the first embodiment. Thus the second embodiment also achieves a weight reduction. Although this embodiment is similar in overall construction to the above embodiment, the change of the case formation makes several differences in minute construction. Portions of the second embodiment substantially corresponding to those of the first embodiment are denoted by corresponding reference characters and will not be described again. The description below will mainly focus on differences.

Figure 5:
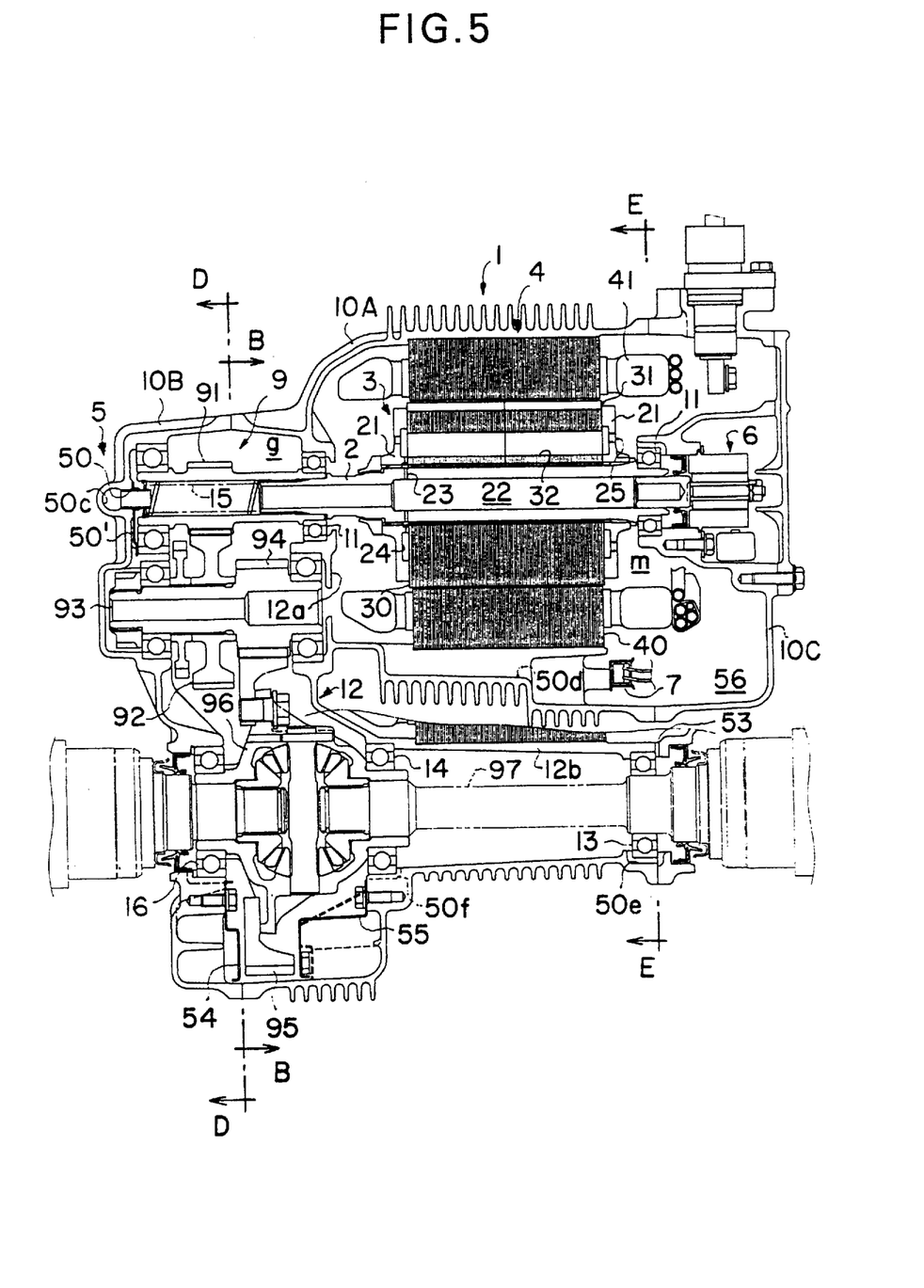
FIG. 5 is a sectional view of a drive apparatus for an electric vehicle according to another embodiment of the present invention developed in the direction of axis.
Figure 6:
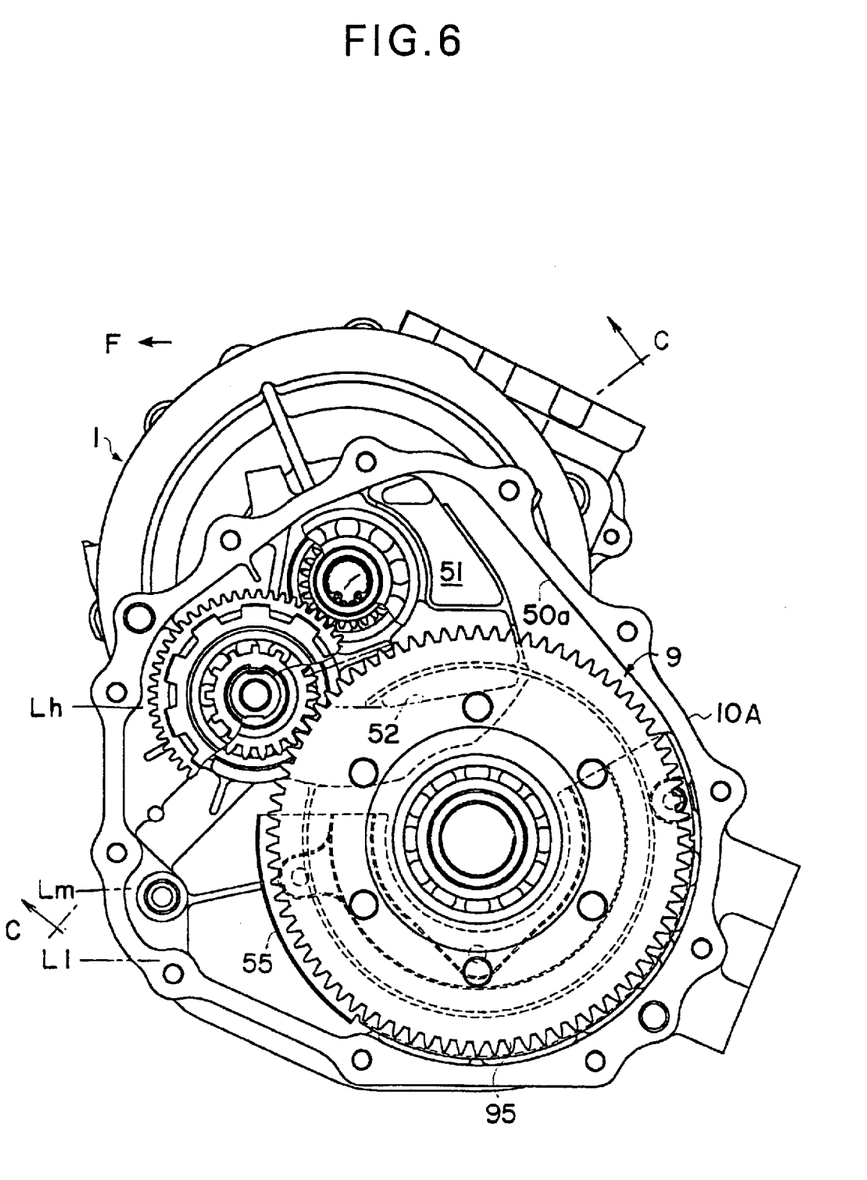
FIG. 6 is a view taken in B—B direction of FIG. 5.

A motor 1 and a gear section 9 are disposed in a consolidated case body 10A, as shown in an actual side view of FIG. 6, in such an arrangement that a rotor shaft 2 of the motor 1 is positioned substantially above the axis of differential gears disposed in a differential case 96 of the gear section 9. As shown in FIG. 5, a motor chamber m of the case 10A is closed by a front case 10C, and a gear chamber g is closed by a rear case 10B. The rotor shaft 2 of the motor 1 is freely rotatably supported at both ends on the case body 10A and the front case 10C by bearings 11. A counter shaft 93 of a counter gear mechanism and the differential case 96 are freely rotatably supported at their opposite ends on the case body 10A and the rear case 10B by bearings. One of yoke shafts 97 (shown by imaginary lines in FIG. 5) engaged with the differential gears in the differential gear by spline engagement is supported on the case 10A. One end of the yoke shaft 97 is supported by a shaft portion of the differential case 96 supported by a bearing 14, and the other end is supported directly by a bearing 13. A large-diameter gear 92 and a small-diameter gear 94 of the counter gear mechanism has a positional relationship which is reversed from the positional relation ship of the corresponding components according to the first embodiment when viewed in the direction of axis, thereby shifting the position of the differential mechanism closer to the motor 1. A size reduction in the direction of axis is thus accomplished.

Figure 7:
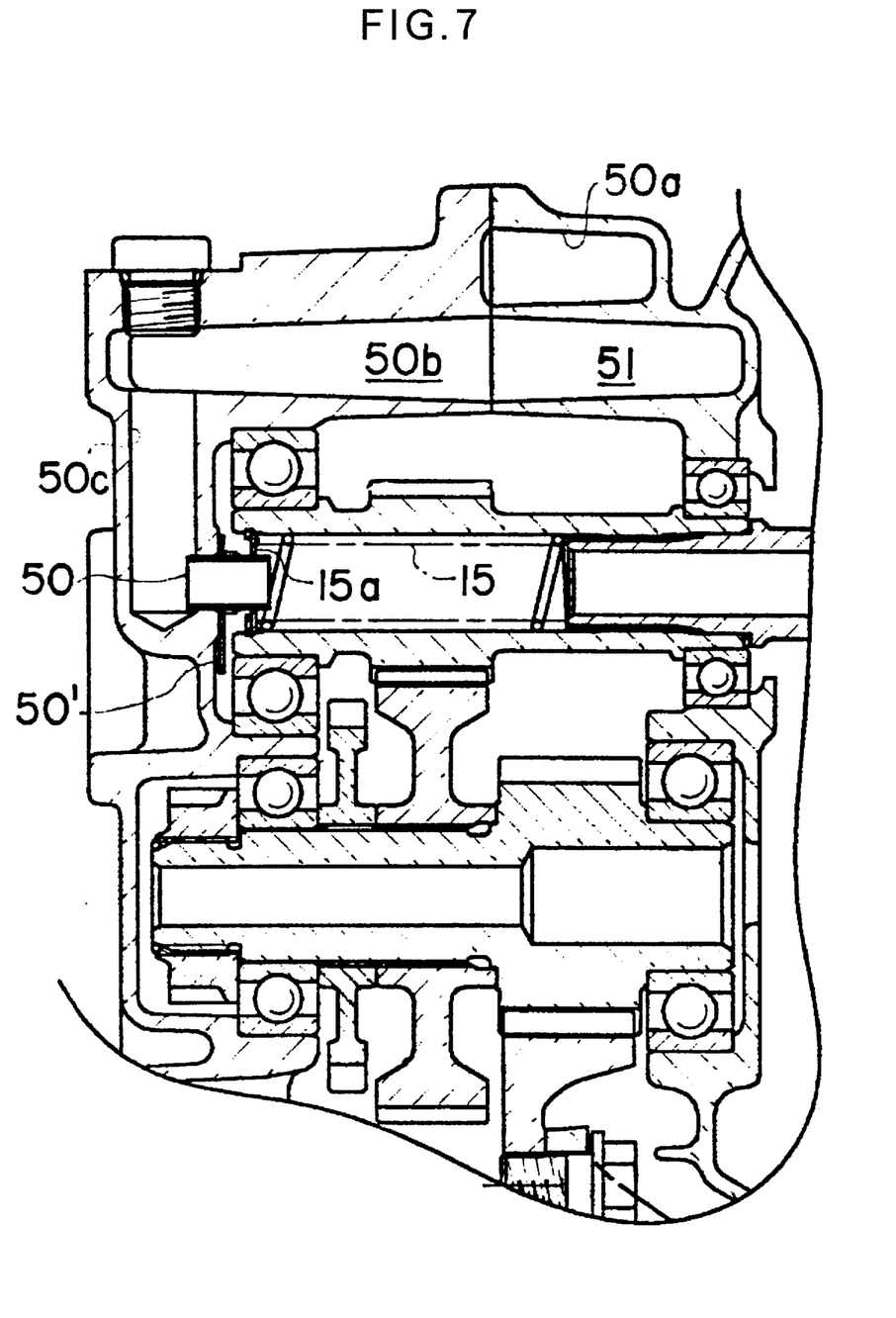
FIG. 7 is a sectional view taken in C—C direction of FIG. 6.
Figure 8:
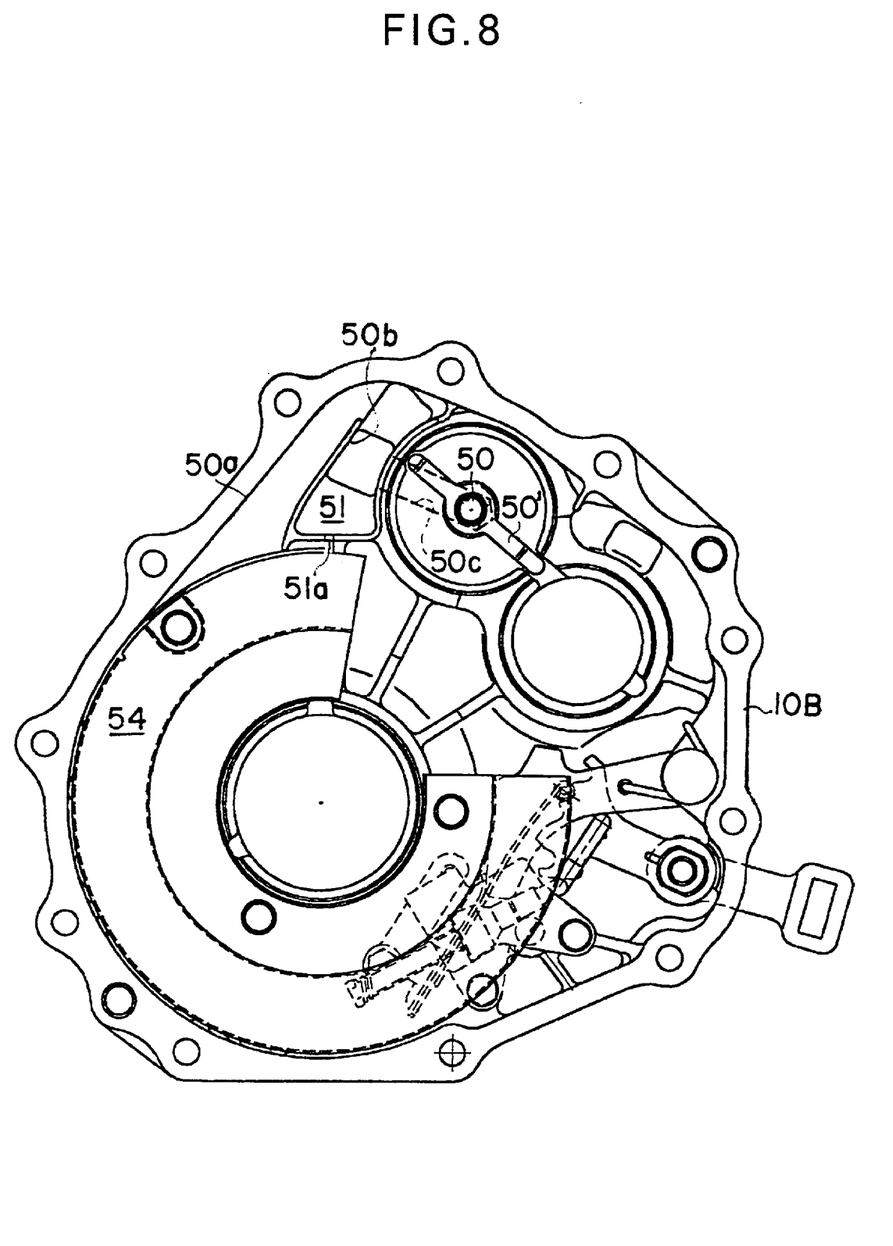
FIG. 8 is a view taken in D—D direction of FIG. 5.

As shown in FIGS. 6–8, supplying means according to this embodiment is formed using case walls extending in the case body 10A and the rear case 10B. The supplying means comprises an oil receiver 51 which is formed above the peripheral face of the gear 95 and between an end face 12a of a partition wall 12 of the case body 10A and a face of the rear case 10B that meets the case body 10A and which has a width substantially equivalent to the distance between the end face 12a and the meeting face of the rear case 10B, an oil supply pipe 50 inserted from the side of the rear case 10B into an end of an in-shaft oil passage 22 of the rotor shaft 2, and in-case oil passages 50a–50c connecting the two components. The in-case oil passage 50a forms a discharge passage of a gear pump that uses the ring gear 95 as a gear-pump gear, and has the same width as the oil receiver 51. The in-case oil passage 50a has an oil passage area that decreases toward upward from the oil receiver 51. The oil receiver 51 is a small-capacity wedge-shape reservoir defined by a bottom wall surface formed by a flat face positioned closed to and above the peripheral face of the ring gear 95, a side wall surface formed by a side face of the in-case oil passage 50a, the second wall formed by an arc-shaped face extending over the outer periphery of the bearing 11 supporting the shaft of the output gear 91 fitted on the outer peripheral face of the rotor shaft 2. The bottom wall of the oil receiver 51 has a small-diameter oil hole 51a that is connected by a line (not shown) to a lubricating oil passage for a bearing 16 supporting the differential case 96. The in-case oil passage 50b is a rectangular sectional-shape oil passage extending from an upper level of the oil receiver 51 through the inside of the rear case 10B in the direction of axis. The in-case oil passage 50b reaches an axial end of the rotor shaft, via the radial oil passages 50c having a circular cross-section. The in-case oil passage 50b is connected to the in-shaft oil passage 22 by the oil supply pipe 50 that is fitted thereto and fixed by a press plate 50' in a fall-off preventing manner.

This embodiment comprises oil feeding means in order to prevent the rotor shaft 2 from floating and moving in the direction of axis. The oil feeding means uses the spiral rotation of a coil spring 15 compressed between an axial end of the rotor shaft 2 and a spring sheet 15a held in the internal peripheral face of a shaft end portion of the output gear 91 in a snap-ring holding fashion In addition, since a lower portion of the gear chamber g is considerably expanded in the direction of axis relative to the width of the ring gear 95 in order to secure an oil sump capacity, an improvement of the oil dragging-up effect of the ring gear 95 is intended by providing a pair of side plates 54, 55 that extend along outer peripheral portions of the opposite side faces of the ring gear 95. The side plates 54, 55 are formed of annular press plates provided separately from the case body 10A and the rear case 10b. As indicated by their two-dimensional shapes shown in FIGS. 6, 8, a circumferential upper portion of each of the side plates 54, 55 that does not contribute much to the dragging-up effect is cut away. The side plates are fastened to the case body 10a and the rear case 10B respectively by bolts.

The oil passages in the motor 1 are constructed substantially the same as in the first embodiment, but differs in minute constructions. As shown in FIG. 5, only one side of the core 30 is provided with radial oil passages 23 connecting to the in-shaft oil passage 22 according to this embodiment. The radial oil passages 23 are connected to axial oil passages 32 formed in the core 30 through connection oil passages formed in plates 21, reaching oil holes 25 that open in a portion of the core 30 located radially inward of the coil ends 41 of the stator 4. The shape of the motor chamber m is different from the shape of the motor chamber according to the above embodiment. According to this embodiment, an oil sump 56 is provided in the motor chamber m by utilizing a connection space created by formation of the motor chamber m and the gear chamber g in the case body 10A, that is, expanding a lower end portion of the motor chamber m, mainly, a lower portion of the front case 10C.

In this construction, the motor chamber m and the gear chamber g are connected to each other by a window 52 formed in the partition 12 on the side of the end face 12a of the case body 10A. A lower edge portion of the window 52 acts as a dam for maintaining the level of oil gathering in a lower portion of the motor chamber m at a level corresponding to the outer peripheral lowermost portion of the rotor 3 indicated by a broken line in the drawing, thus enabling the lower portion of the motor chamber m to serve as an oil reservoir. The lower edge portion of the window 52 is inclined according to this embodiment. The inclination is provided considering the hill-climb running of a vehicle in which the apparatus is installed. Thereby if the case body 10A is inclined with a front portion lifted (the forward direction with respect to the apparatus installed in a vehicle is indicated by reference character F), the embodiment will not cause the oil level in the motor chamber m to decrease but maintain the oil level in the motor chamber m. The motor chamber m of the gear chamber g are connected with each other also by the small-diameter orifice 53 formed in the partition 12 on the side of the peripheral face 12b of the case body 10A at a level (see FIG. 9) lower than the level of the window 52 formed in the partition 12 on the side of the end face 12a, distinguished from the aforementioned embodiment. The orifice 53 acts as in the aforementioned embodiment, that is, allows oil recovered in the lower portion of the motor chamber m to gradually flow into the gear chamber g when the oil recovery is stopped, thus balancing the oil levels in the two chambers.

Figure 9:
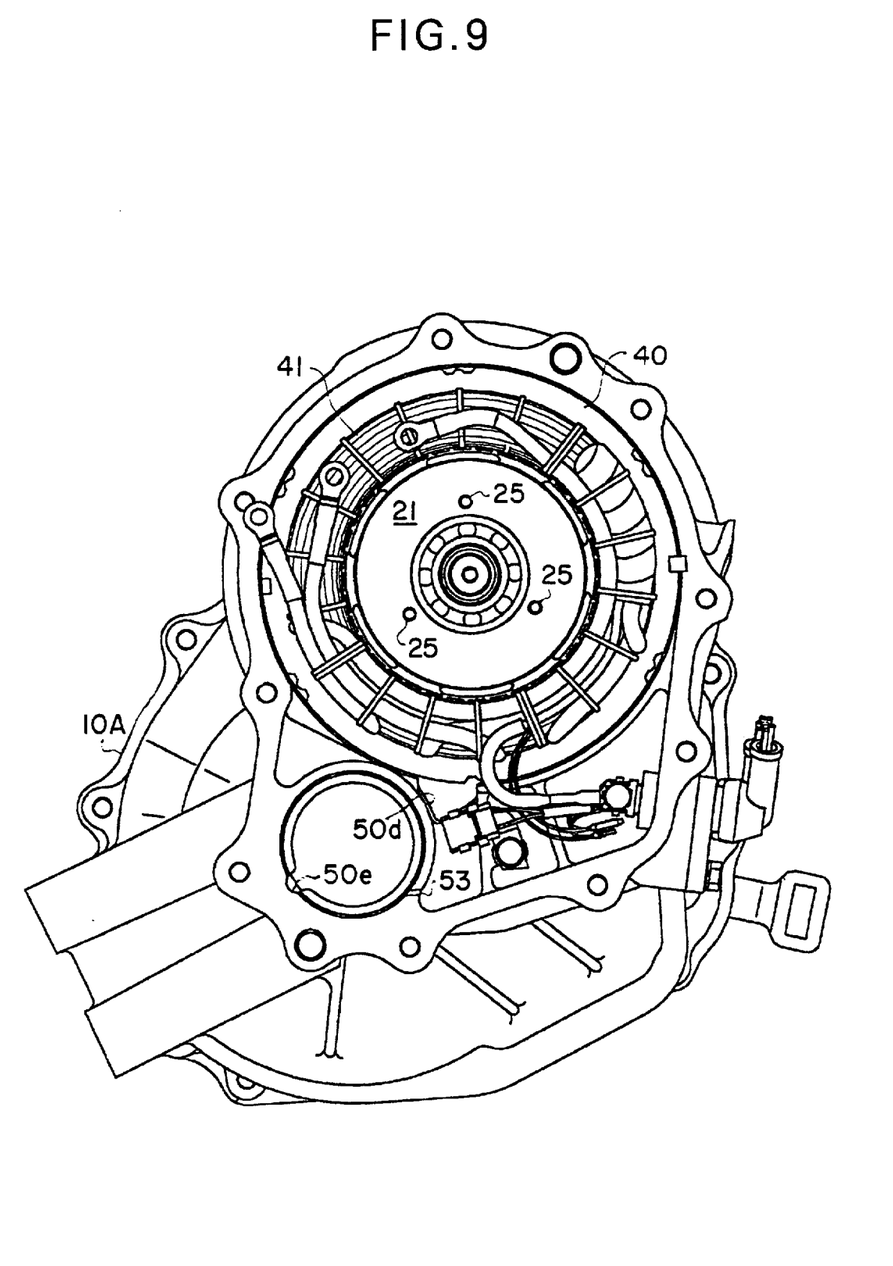
FIG. 9 is a view taken in E—E direction of FIG. 5.

This embodiment comprises a first return oil passage corresponding to the return passage formed by a key groove extending across the opposite ends of the stator 4 according to the first embodiment and, in addition, a second return oil passage provided as a separate system in parallel with the first return oil passage. The first return oil passage is formed as a return oil passage 50d extending along a lowermost portion of the peripheral face of the stator and extending through an outwardly protruding portion of the case body along the peripheral face of the stator in the direction of axis, as shown in FIGS. 5 and 9. The second return oil passage is formed as an oil passage extending through a yoke-shaft-97 accommodating portion of a universal joint provided in the gear chamber g. In the second return oil passage, cut-away portions 50e, 50f extending in the direction of axis over the outer peripheries of the respective outer laces of the bearing 13, 14 supporting the opposite ends of the yoke shaft 97 are formed downstream of the orifice 53. The inlet to the oil passage 50d in the oil sump 56 is provided with an oil temperature sensor 7 for motor control in accordance with oil temperature.

In the drive apparatus thus constructed, the oil serving as a lubricant and a coolant is held mainly in the gear chamber g up to the level Lm indicated by the intermediate broken line in FIG. 6, as in the above-described embodiment. Thus this construction secures a sufficient oil level for a start for which the gear section 9 requires more lubrication than for the normal running. When the motor 1 starts to operate in this state, the ring gear 95 driven by the motor 1 rotates counterclockwise in FIG. 6, dragging up oil, so that oil is pushed up through the oil passage 50a extending along the inner peripheral face of the case body 10A and supplied into the oil receiver 51. Unlike the above-described embodiment receiving splashes of dragged-up oil, this embodiment forces oil into the oil receiver 51 by using centrifugal force, so that the flow of oil takes in oil deposited on the internal peripheral face of the case body 10A, thus considerably improving the supply efficiency. The oil thus collected in the oil receiver 51 is guided to the oil supply pipe 50 via the oil passages 50b, 50c of the rear case 10B, and then supplied into the in-shaft oil passage 22 of the rotor shaft 2. The further flow of oil on the motor side and its cooling operation are the same as described in conjunction with the first embodiment.

After cooling the motor 1, oil flows down along the case body 10A or drips from various portions, as in the above-described embodiment, to gather in a lower portion of the case body 10A, mainly forming a stream through the first return oil passage. An amount of oil that exceeds the lower edge level of the window 52 returns to the gear chamber g. According to this embodiment, oil that gathers in a portion of the case body 10A on a side of the core 40 remote from the gear chamber is guided to the side of the window 52 through the oil passage 50d. During operation of the motor, the flowing of oil through the aforementioned oil passages and the like reduces the oil level in the gear chamber g to the level L1 indicated by the lowermost broken line in FIG. 6, and maintains the oil level in the case body 10A at the level Lh indicated by the uppermost broken line, which enables the maximum cooling of the stator 4 without causing the stirring by rotation of the rotor 3. According to this embodiment, an axial end of the counter shaft 93 positioned at substantially the same level as the window 52 is provided with an opening extending through the end face 12a of the partition 12. Oil flowing through this opening back into the gear chamber g lubricates the bearings of the counter shaft 93.

According to this embodiment, when the operation of the motor 1 is stopped, oil is returned from the oil receiver 51 to the gear chamber g via the oil hole 51a of the bottom wall of the oil receiver 51 and the bearing 16, and also oil flows from the oil sump 56 of the motor chamber m through the orifice 53 and returns to the gear chamber g forming a stream through the second return oil passage. The oil flowing though the orifice 53 flows by an end portion of the gear chamber g, and flows through the oil passage 50e, the accommodation portion for the yoke shaft 97, and the oil passage 50f, and then returns to the gear chamber g, thus gradually balancing the two oil levels. The oil levels finally become the level Lm indicated by the intermediate broken line in the drawing.

As described above, the drive apparatus according to the second embodiment achieves substantially the same advantages as achieved by the first embodiment and, in addition, advantageously improves the oil gathering efficiency of the oil receiver 51. Furthermore, since the lower edge of the window 52 is inclined with a front portion lowered, the level of the lower edge of the window 52 remains substantially unchanged on an uphill road, thus excluding the influences of the forward or rearward inclination of the vehicle on the oil level. Furthermore, since the oil temperature sensor 7 is disposed in the oil sump 56 of the motor chamber m for temperature detection, the embodiment advantageously controls the motor on the basis of precise determination of the motor load at various time points made from the actual oil temperature detected after the cooling of the motor.

Figure 10:
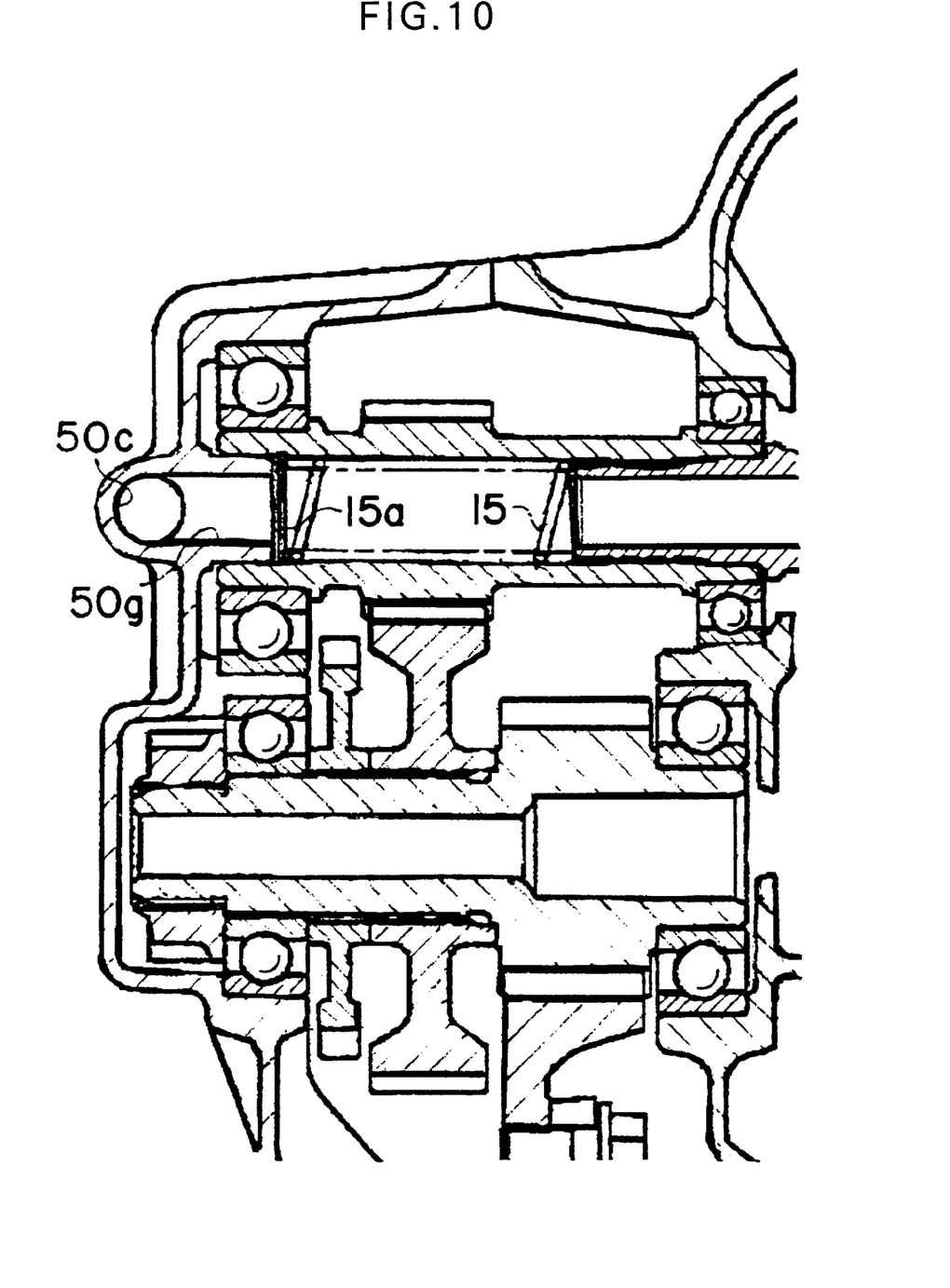
FIG. 10 is a fragmentary axial sectional view where the supplying means according to the second embodiment is modified in part.

Finally, FIG. 10 illustrates a modification of the second embodiment where the entire supplying means 5 is integrated with the case. In this modification, a portion corresponding to the oil passage pipe 50 constituting the oil passage of the supplying means 5 according to the above-described embodiment is integrated with the rear case 10B and formed as a tubular oil passage 50g extending from an end of the rear case 10B and fitted to a shaft hole of the output gear 91. In addition, the snap ring for the spring 15 is shifted to a position near the end face of the tubular oil passage 50g located inwardly of the end of the shaft hole of the output gear 91 and fitted to the shaft hole in that position, and the snap ring is used as a spring sheet 15a. This construction is useful for reducing the gap between the outer peripheral face of the tubular oil passage 50g and the shaft hole of the output gear 91 in order to reduce oil leak from the supply oil passage. In addition, since this construction allows omission of the press plate 50' and the oil passage pipe 50 employed in the above embodiments, this construction is also advantageous in reduction of the number of component parts and, therefore, reduction of assembly man hours.

While the present invention has been described with reference to the embodiments thereof, the present invention is not limited to these embodiments. On the contrary, specific constructions of the invention may be modified in reduction to practice in various manners included in the scope of the description in the claims. In particular, the supplying means may be formed by an oil pump that is driven by rotation of the gear section or revolution of the motor.

INDUSTRIAL APPLICABILITY

As described above, the drive apparatus for an electric vehicle of the present invention is useful as a drive apparatus for various motor vehicles, and it is particularly suitable for use as a drive apparatus installed in an electric vehicle in an on-board fashion.

We claim:

1. A drive apparatus for an electric vehicle characterized by comprising a motor (1) including a stator (4) and a rotor (3) having a rotor shaft (2) that is rotatable inside the stator, a gear section (9) for transmitting rotation of the rotor shaft to a wheel, and a case (10, 90) for accommodating the motor and the gear section, wherein the case has a partition (12) that separates a motor chamber (m) for accommodating said motor and a gear chamber (g) for accommodating said gear section, and the partition has an orifice (53) that connects a lower portion of said motor chamber and said gear chamber, and supplying means (5) is provided for supplying oil from said gear chamber into said motor chamber in accordance with rotation of said gear section.

2. A drive apparatus for an electric vehicle according to claim 1, characterized in that said supplying means comprises an oil receiver (51) for receiving oil in the gear chamber drawn up by rotation of the gear section and guiding the oil into the motor chamber.

3. A drive apparatus for an electric vehicle according to claim 1, characterized in that a window (52) connecting said motor chamber and said gear chamber is formed in a position which is above said orifice of the partition and which is at substantially the same level as a lowermost position of a peripheral face of said rotor.

4. A drive apparatus for an electric vehicle according to claim 2, characterized in that a window connecting said motor chamber and said gear chamber is formed in a position which is above said orifice of the partition and which is at substantially the same level as a lowermost position of a peripheral face of said rotor.

* * * * *